(12) United States Patent
Ma et al.

(10) Patent No.: US 9,644,770 B2
(45) Date of Patent: May 9, 2017

(54) PIPE MATERIAL

(71) Applicant: NANYANG EDIBLE FUNGUS TECHNOLOGY EXCHANGE CENTER (GENERAL PARTNERSHIP), Henan (CN)

(72) Inventors: Xinpan Ma, Henan (CN); Qi Gao, Henan (CN); Xuechun Wang, Henan (CN)

(73) Assignee: NANYANG EDIBLE FUNGUS TECHNOLOGY EXCHANGE CENTER, Henan (CN)

( * ) Notice: Subject to any disclaimer, the term of this patent is extended or adjusted under 35 U.S.C. 154(b) by 199 days.

(21) Appl. No.: 14/411,589

(22) PCT Filed: Mar. 26, 2013

(86) PCT No.: PCT/CN2013/073160
§ 371 (c)(1),
(2) Date: Dec. 29, 2014

(87) PCT Pub. No.: WO2014/000477
PCT Pub. Date: Jan. 3, 2014

(65) Prior Publication Data
US 2015/0159783 A1 Jun. 11, 2015

(30) Foreign Application Priority Data
Jun. 28, 2012 (CN) .......................... 2012 1 0216281

(51) Int. Cl.
*F16L 9/18* (2006.01)
*F16L 9/128* (2006.01)
*F16L 7/00* (2006.01)

(52) U.S. Cl.
CPC .................. *F16L 9/128* (2013.01); *F16L 7/00* (2013.01); *F16L 9/18* (2013.01)

(58) Field of Classification Search
CPC .............. F16L 7/00; F16L 9/18; F16L 39/005
(Continued)

(56) References Cited

U.S. PATENT DOCUMENTS 289,744 A * 12/1883 Aldrich .................... F16L 59/12
138/113
2,903,017 A * 9/1959 Cotman, Jr. ............ F16L 59/13
138/113
(Continued)

FOREIGN PATENT DOCUMENTS

CN 2363152 Y 2/2000
CN 2416319 Y 1/2001
(Continued)

OTHER PUBLICATIONS

International Search Report issued in PCT/CN2013/073160 mailed Jul. 4, 2013.

*Primary Examiner* — Patrick F Brinson
(74) *Attorney, Agent, or Firm* — Rossi, Kimms & McDowell LLP

(57) ABSTRACT

The present invention discloses a pipe material including the pipe body. Spacers are set inside the pipe body. The outer wall of the spacer is in close fit with the inner wall of the pipe body. In the present invention, the spacer set inside the pipe material can well support the pipe wall and better enhance the mechanical strength and anti-bending performance of the pipe. Due to the close fit between the outer wall of the spacer and the inner wall of the pipe body, the bonding between the spacer with certain thickness and the pipe body enhances its force in any direction and improves the stress performance of the pipe body. The interaction of multiple spacers ensures the local stability of the pipe body between spacers. The interaction between the spacer and the pipe (Continued)

wall ultimately improves various performances of the pipe, especially its anti-bending performance.

9 Claims, 4 Drawing Sheets

(58) Field of Classification Search
 USPC .................................................. 138/112–114
 See application file for complete search history.

(56) References Cited

U.S. PATENT DOCUMENTS

| | | | | | |
|---|---|---|---|---|---|
| 3,559,730 | A | * | 2/1971 | Denjean | F16L 5/10 165/158 |
| 3,789,129 | A | * | 1/1974 | Ditscheid | H01B 11/1808 138/113 |
| 4,098,476 | A | * | 7/1978 | Jutte | F16B 4/004 138/108 |
| 4,156,299 | A | * | 5/1979 | Kovac | F28F 9/0131 138/106 |
| 4,246,937 | A | * | 1/1981 | Muller | E04C 5/08 138/108 |
| 4,691,741 | A | * | 9/1987 | Affa | F16L 59/07 138/113 |
| 7,156,126 | B2 | * | 1/2007 | Topek | F16L 7/00 138/108 |

FOREIGN PATENT DOCUMENTS

| | | | |
|---|---|---|---|
| CN | 102705690 | A | 10/2012 |
| KR | 1020110016647 | A | 2/2011 |
| TW | 200716901 | A | 5/2007 |

\* cited by examiner

PIPE MATERIAL

FIELD OF THE INVENTION

The present invention relates to the technical field of building material and equipment, and specifically, it relates to a kind of pipe material.

BACKGROUND OF THE INVENTION

Pipe materials include metal pipes and non-metallic pipes. Steel pipe is the most common metal pipe, which is widely used at present. The steel pipe is used to transfer fluid and powder, exchange heat and produce mechanical parts and containers, and what's more it is a kind of cost-effective steel. The steel pipe can be used to reduce the weight of the structural frame, pillar and mechanical support, save 20-40% of metal and achieve factory-like and mechanized construction. It can also be used to save steel in roads and bridges, simplify the construction, greatly reduce the area of protective coating and save investment and maintenance expense. Therefore, there isn't any other type of steel product that can completely replace the steel pipe, but the steel pipe can replace part of sections and bars. The steel pipe is far more closely associated with the development of the national economy and the improvement of the living quality of human than any other steel product. From people's daily utensils, furniture and facilities of water supply and drainage, gas supply, ventilation and heating to the manufacturing of a variety of agricultural machines, the development of underground resources, the production of guns, bullets, missiles and rockets used in national defense and aerospace, steel pipes are necessary. Just because the steel pipe is closely associated with people's living and production, the production technology in the steel pipe industry not only develops rapidly but also innovates consecutively. Steel pipes occupy an irreplaceable position in the steel industry. At present, there are a variety of steel pipes, but their strength and anti-bending and anti-deformability performances are still not satisfactory, and their quality and strength ratio is still below the optimal.

SUMMARY OF THE INVENTION

The present invention provides a kind of pipe material that has a simple structure, a low cost, a satisfactory quality and strength ratio and powerful functions.

To solve the above technical problems, the technical scheme used in the present invention is as follows: a kind of pipe material, including the pipe body. Spacers are set inside the pipe body and the outer wall of the spacer is in close fit with the inner wall of the pipe body.

The cross section of the spacer is impeller-shaped.

An adhesive layer is arranged between the spacer and the inner wall of the pipe body.

Both end faces of the spacer are concave.

A control handle is set on the end face of the spacer.

A number of spacers are set on the connecting rod to form a spacer string.

A reinforcing ring is set in close fit with the outer wall of the pipe body.

One reinforcing ring corresponds with one spacer set inside the pipe body.

The reinforcing ring is in magnetic connection with the spacer set inside the pipe body.

In the present invention, the spacer set inside the pipe can better support the pipe wall and enhance the mechanical strength and anti-bending performance of the pipe. Due to the close fit between the outer wall of the spacer and the inner wall of the pipe body, the bonding between the spacer with certain thickness and the pipe body enhances its force in any direction and improves the stress performance of the pipe body. The interaction of multiple spacers ensures the local stability of the pipe body between spacers. The interaction between the spacer and the pipe wall ultimately improves various performances of the pipe, especially its anti-bending performance. An adhesive layer is set between the outer wall of the spacer and the inner wall of the pipe body, such as the modified resin BMIDDMEPDXY synthesized from metal adhesive a-cyanoacrylate, diphenylmethane bismaleimide, DDM oligomer of diaminodiphenylmethane and epoxy resin, to achieve tight connection between the spacer and the pipe body within a short time through temperature technology or operating means. The two concave end faces of the spacer can effectively reduce the weight of the spacer and increase the overall strength and weight ratio of the pipe and also. They are also closer to the bamboo joint structure and more consistent with the principle of bionics, which bring better mechanical effects, reduce the weight of the building material under the same mechanical properties conditions, and reduce the use of steel and other materials. Therefore, the present invention has a prominent substantial significance in saving building materials and metal and reducing emissions. A control handle is set on the end face of the spacer to facilitate the placement into the pipe. And a simple special tool is used to manipulate the control handle to facilitate the installation of spacer into the pipe body at any suitable location and make it easy to adjust. Multiple spacers are set on a connecting rod to form a spacer string, which makes it very easy to place a string of spacers into the pipe body at the same time. The method can lead to close fit between the spacer string and the pipe body according to the contraction principle and even interference fit as required. The reinforcing ring is set in close fit with the outer wall of the pipe body, which can further improve the stability of the pipe body. Especially in the case that the reinforcing ring corresponds to the spacer outside the pipe body, the mechanical effect will be more prominent. The magnetic connection between the reinforcing ring and the spacer inside the pipe body can better ensure the relationship between them. In addition, the magnetic lines of force can increase the activity of molecules within two close parts to improve their speed of mutual penetration and ultimately create a better magnetic environment for the formation of a more satisfactory bionic pipe with bamboo structure. What's more remarkable is the closed cavities divided by the spacers inside the pipe body, which help prevent and reduce the oxidation of the inner wall of the pipe body, increase the oxidation resistance of the inner wall and reduce the cost of difficult inside coating. Therefore, the present invention has positive economic and social benefits.

BRIEF DESCRIPTION OF THE DRAWINGS

Next, the present invention is further described in combination with the accompanying drawings.

DETAILED DESCRIPTION OF THE INVENTION

Embodiment 1

Figure 1:
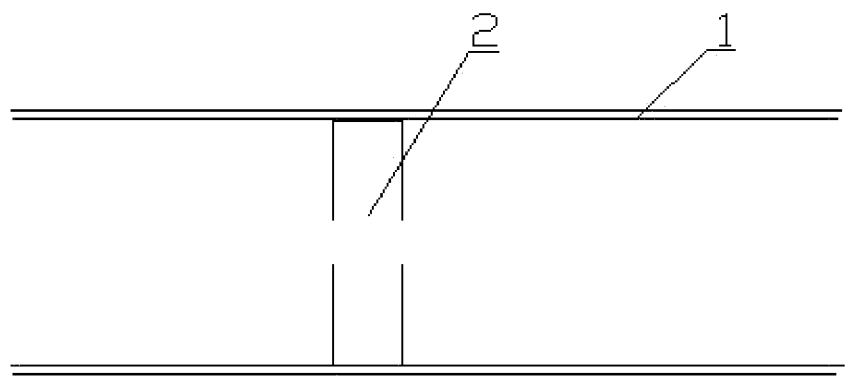
FIG. 1 is the structural view of embodiment 1.

As shown in FIG. 1: A pipe material including the pipe body 1. Spacers 2 are set inside the pipe body 1. The pipe body 1 is seamless round steel pipe, the spacer 2 is homogeneous cylinder, and the two are closely fitted with each other.

Embodiment 2

Figure 2:
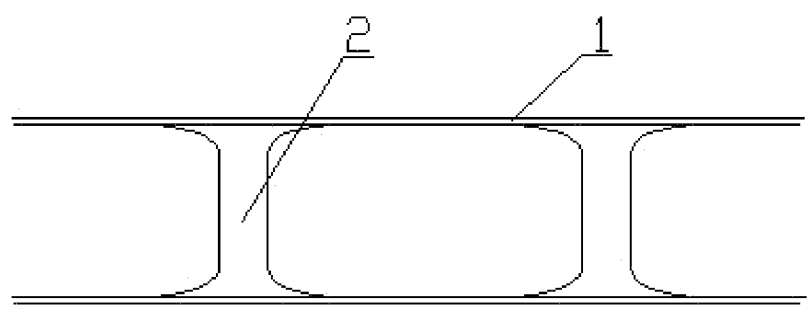
FIG. 2 is the structural view of embodiment 2.
Figure 3:
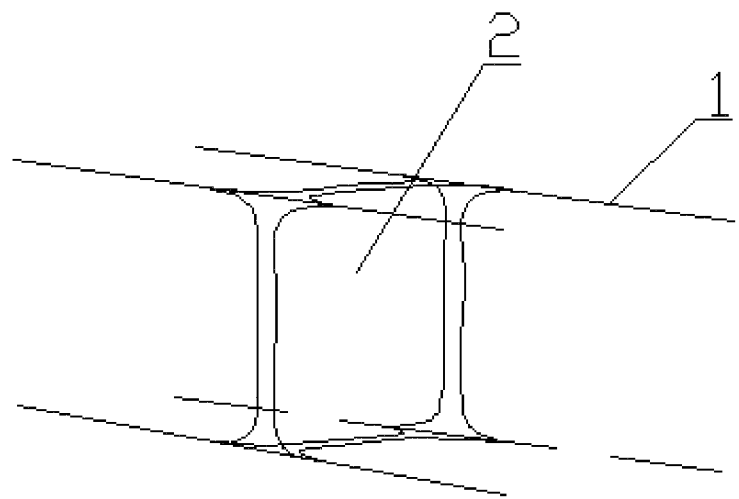
FIG. 3 is the perspective view of embodiment 2.

As shown in FIG. 2 and FIG. 3: A pipe material including the pipe body 1. Spacers 2 are set inside the pipe body, each of which has four convex corners. The pipe body 1 is a seamed square pipe, and the four ridges of the square pipe are respectively in close connection with the four convex thick petals of the spacer 2. The petaloid structure is for better stress combination and less use of steel. An adhesive layer is arranged between the outer wall of the spacer 2 and the inner wall of the pipe body 1, such as the metal adhesive a-cyanoacrylate.

Embodiment 3

Figure 4:
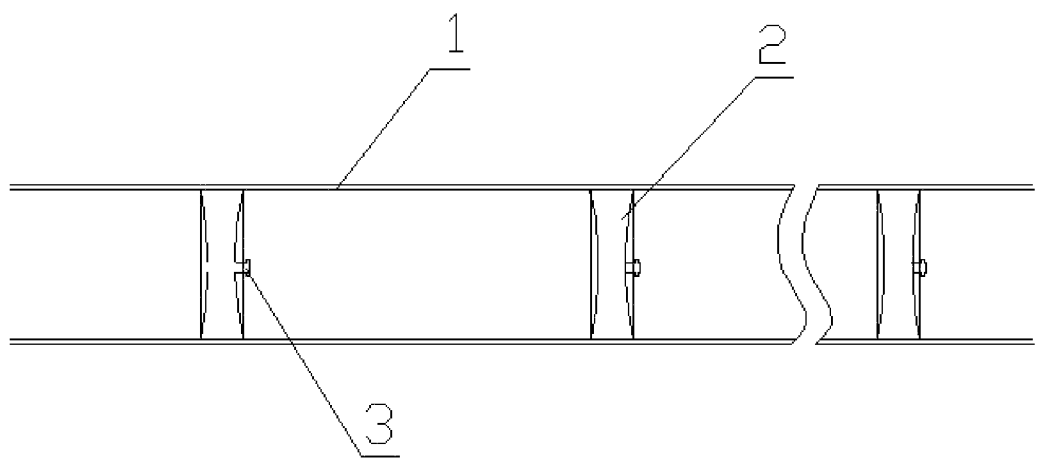
FIG. 4 is the structural view of embodiment 3.

As shown in FIG. 4: A pipe material including the pipe body 1. The inside of the pipe body 1 is provided with multiple spacers 2. Both end faces of the spacer 2 are concave, on which a control handle 3 is set. The control handle 3 can effectively reduce the weight of the spacer 2 and increase the strength and weight ratio of the pipe material. A control handle 3 is set on the end face of the spacer 2 to facilitate the placement into the pipe. And a simple special tool is used to manipulate the control handle 3 to facilitate the installation of spacer 2 into the pipe body 1 at any suitable location and make it easy to adjust. An adhesive course is set between the outer wall of the spacer 2 and the inner wall of the pipe body 1, such as the modified resin BMIDDMEPDXY synthesized from diphenylmethane bismaleimide, DDM oligomer of diaminodiphenylmethane and epoxy resin, to achieve tight connection between the spacer 2 and the pipe body 1 within a short time through temperature technology or operating means.

Embodiment 4

Figure 5:
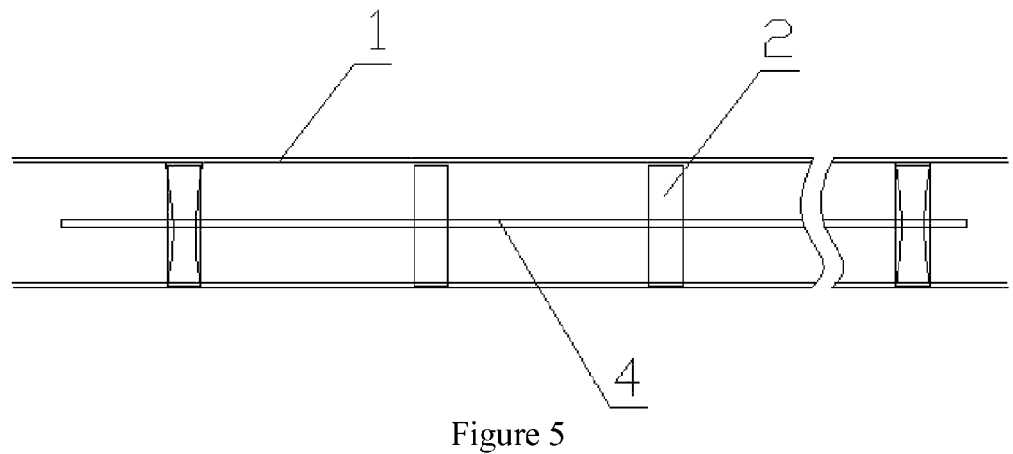
FIG. 5 is the structural view of embodiment 4.

As shown in FIG. 5: A material pipe including the pipe body 1. The inside of the pipe body 1 is provided with multiple spacers 2. Multiple spacers 2 are set at a connecting rod 4 to form a spacer string, which can be placed into the pipe body 1 very easily at the same time. The assembly method of the seamless pipe can realize the close fit between the spacer string and the pipe body 1 according to the contraction principle and even interference fit as required. For example, the hot oil can be used to heat the pipe body 1 or the dry ice can be used to cool the spacer string. The seamed pipe can roll the cooled spacer sting into the bending plate for welding and can achieve direct welding between the spacer string and the welding position.

Embodiment 5

Figure 6:
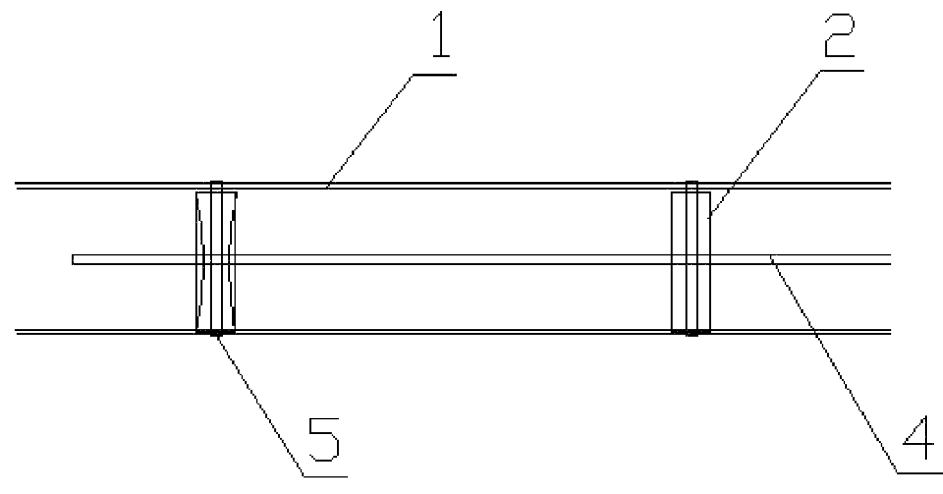
FIG. 6 is the structural view of embodiment 5.

As shown in FIG. 6: A pipe material including the pipe body 1. The inside of the pipe body 1 is provided with multiple spacers 2. The reinforcing ring 5 which is in close fit with the outer wall of the pipe body 1 is set outside the pipe body 1, which can further improve the stability of the pipe body 1. In the case that the reinforcing ring 5 corresponds with and the spacer 2 set outside the pipe body 1, the mechanical effect is more prominent. An adhesive course is set between the outer wall of the spacer 2 and the inner wall of the pipe body 1, such as the metal adhesive a-cyanoacrylate.

Embodiment 6

Figure 7:
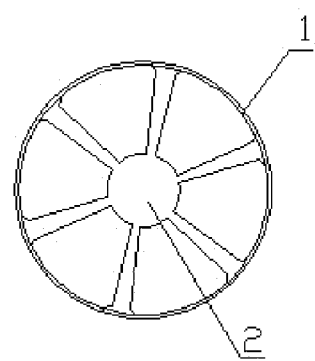
FIG. 7 is the structural view of embodiment 6.

As shown in FIG. 7: A pipe material including the pipe body 1. The inside of the pipe body 1 is provided with multiple spacers 2. The spacer 2 is impeller-shaped. The outer circle of the impeller-shaped spacer 2 is in close fit with the inner wall of the pipe body 1, which can save materials and further improve the stability of the pipe body 1. An adhesive layer is set between the outer wall of the spacer 2 and the inner wall of the pipe body 1, such as the modified resin BMIDDMEPDXY synthesized from metal adhesive a-cyanoacrylate, diphenylmethane bismaleimide, DDM oligomer of diaminodiphenylmethane and epoxy resin, to achieve tight connection between the spacer 2 and the pipe body 1 within a short time through temperature technology or operating means.

Embodiment 7

Figure 8:
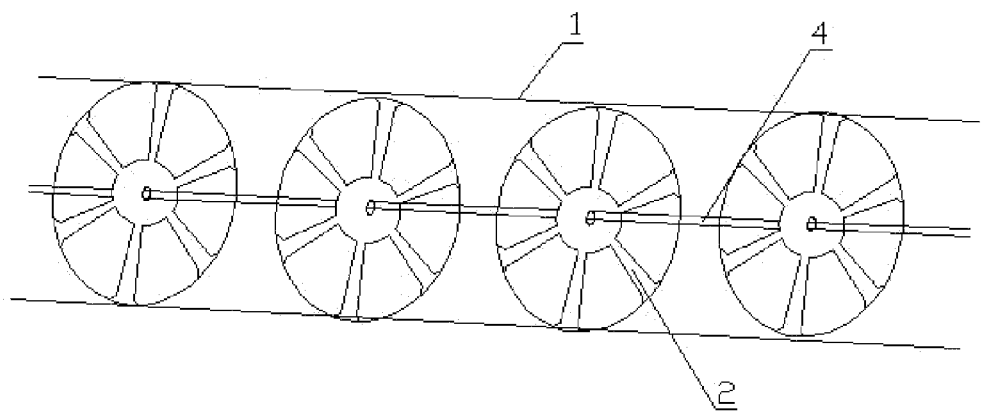
FIG. 8 is the structural view of embodiment 7.

As shown in FIG. 8: A pipe material including the pipe body 1. The inside of the pipe body 1 is provided with multiple spacers 2. The spacer 2 is impeller-shaped. The outer circle of the impeller-shaped spacer 2 is in close fit with the inner wall of the pipe body 1, which can save materials and further improve the stability of the pipe body 1. Multiple spacers 2 are set at a connecting rod 4 to form a spacer string, which can be placed into the pipe body 1 very easily at the same time. The assembly method of the seamless pipe can realize the close fit between the spacer string and the pipe body 1 according to the contraction principle and even interference fit as required. For example, the hot oil can be used to heat the pipe body 1 or the dry ice can be used to cool the spacer string. The seamed pipe can roll the cooled spacer sting into the bending plate for welding and can achieve direct welding between the spacer string and the welding position.

The present invention defines a the pipe material with spacers, and as long as their performance can be improved with spacers, the non-metallic pipes or metal pipes such as steel pipe, aluminum pipe and alloy pipe or the round, oval, square, polygonal or shaped pipes are all within the scope of protection of the present invention and are not limited to the disclosed embodiments of the present invention.

What is claimed is:

1. A pipe including:
   a pipe body; and
   spacers set inside the pipe body and coupled with an inner wall of the pipe body,
   wherein an end face of a first spacer among the spacers is concave or a cross section of a first spacer among the spacers is impeller-shaped.

2. The pipe according to claim 1, wherein an adhesive layer is set between an outer wall of a first spacer among the spacers and the inner wall of the pipe body.

3. The pipe according to claim 1, wherein a control handle is set on an end face of a first spacer among the spacers.

4. The pipe according to claim 1, wherein multiple spacers are connected to a connecting rod to form a spacer string.

5. The pipe according to claim 1, further comprising a reinforcing ring disposed on an outer wall of the pipe body.

6. The pipe according to claim 5, a position of the reinforcing ring corresponds with a position of a first spacer among the spacers.

7. The pipe according to claim 6, wherein the reinforcing ring is in magnetic connection with the first spacer.

8. A pipe including:
   a pipe body; and
   spacers set inside the pipe body and coupled with an inner wall of the pipe body,
   wherein multiple spacers are connected to a connecting rod to form a spacer string.

9. A pipe including:
   a pipe body;
   spacers set inside the pipe body and coupled with an inner wall of the pipe body; and
   a reinforcing ring disposed on an outer wall of the pipe body,
   wherein a position of the reinforcing ring corresponds with a position of a first spacer among the spacers, and
   wherein the reinforcing ring is in magnetic connection with the first spacer.

\* \* \* \* \*